(12) United States Patent
Shen

(10) Patent No.: US 6,609,600 B1
(45) Date of Patent: Aug. 26, 2003

(54) CENTRIFUGAL CLUTCH

(76) Inventor: Chin Hua Shen, No. 54, Lane 134, Tung An Road, Tainan City (TW)

( * ) Notice: Subject to any disclaimer, the term of this patent is extended or adjusted under 35 U.S.C. 154(b) by 0 days.

(21) Appl. No.: 10/078,507

(22) Filed: Feb. 21, 2002

(51) Int. Cl.[7] ............................................. F16D 47/00
(52) U.S. Cl. ............................ 192/48.5; 192/105 CD; 192/55.1; 192/48.3
(58) Field of Search ................... 192/48.3, 48.4, 192/48.5, 55.1, 105 CD, 104 B, 69.71, 339

(56) References Cited

U.S. PATENT DOCUMENTS

| | | | | |
|---|---|---|---|---|
| 2,038,450 A | * | 4/1936 | Roesch | 192/48.3 |
| 2,663,396 A | * | 12/1953 | Wagner | 192/105 CD |
| 2,709,372 A | * | 5/1955 | Melone | 74/230.17 |
| 4,106,605 A | * | 8/1978 | Winchell | 192/105 CD |
| 4,294,342 A | * | 10/1981 | St. John | 192/105 CD |
| 5,597,060 A | * | 1/1997 | Huddleston et al. | 192/105 CD |
| 6,165,096 A | * | 12/2000 | Seith | 192/105 CD |

* cited by examiner

*Primary Examiner*—Charles A. Marmor
*Assistant Examiner*—Eric Williams
(74) *Attorney, Agent, or Firm*—Charles E. Baxley

(57) ABSTRACT

A centrifugal clutch comprises a driving wheel, an operative disc connected to the driving wheel to move therewith, a transmission disc mounted to an outer periphery of the operative disc, a follower shaft, a friction mechanism, and a coupling device for releasable coupling with a gear train of a gearbox. The follower shaft extends through the driving wheel, the operative disc, and the transmission disc. The friction mechanism is fixed to the transmission disc and in frictional engagement with a friction portion of the driving wheel. When the driving wheel turns at an idling speed, the friction portion drives the friction mechanism, the transmission disc, and the follower shaft to turn slowly with a constant torque, thereby allowing easy gear shifting through the coupling device.

4 Claims, 7 Drawing Sheets

CENTRIFUGAL CLUTCH

BACKGROUND OF THE INVENTION

1. Field of the Invention

The present invention relates to a centrifugal clutch allowing smooth, convenient shifting of gear.

2. Description of the Related Art

A centrifugal clutch is generally used in a beach car or other vehicles. FIG. 5 of the drawings illustrates a conventional centrifugal clutch comprising a driving wheel 1', an operative disc 2', a transmission disc 3', and a follower shaft 4'. The driving wheel 1' is driven by an engine (not shown) via a belt 11'. The driving wheel 1' includes a central hole 12' for receiving a bearing 13' through which the follower shaft 4' extends. A side of the driving wheel 1' includes an engaging portion 14' to which a nut 15' is threadedly engaged.

The operative disc 2' includes a central hole 21' through which the follower shaft 4' extends, thereby securely engaging with the driving wheel 1' to move therewith. The operative disc 2' further includes plural pivotal blocks 22' on an outer periphery thereof. Each pivotal block 22' has an end pivoted to the operative disc 2' and a friction plate 23' on an outer side thereof. Each pivotal block 22' is attached to the operative disc 2' by a spring 24'. In a normal state, each pivotal block 22' is received in the operative disc 2' under the action of the associated spring 24'.

The transmission disc 3' is mounted to the outer periphery of the operative disc 2' and includes an engaging portion 31' for frictional engagement with the pivotal blocks 22' to move therewith. The transmission disc 3' further includes a central hole 32' for engaging with the follower shaft 4' to move therewith.

The follower shaft 4' extends through the driving wheel 1', the operative disc 2', and the transmission disc 3'. An end of the follower shaft 4' includes teeth 41' and a threaded portion 42'. The teeth 41' of the follower shaft 4' mesh with teeth 33' in the central hole 32' of the transmission disc 3', and a nut 43' is engaged with the threaded portion 42' for positioning purpose. A coupling device 5' is mounted to the follower shaft 4' and includes a coupling block 51' and a gear 52' that is connected to a gear train (not shown) in a gearbox (not shown) of a vehicle. The coupling block 51' includes plural protrusions 511' on a side thereof. The gear 52' includes plural recesses 521' for releasable engagement with the protrusions 511', thereby allowing joint movement of the gear 52' and the coupling block 51'.

In an idle state, the engine drives the driving wheel 1' to run at the idling speed, which, in turn, causes rotation of the operative disc 2', but the follower shaft 4' is not turned. When the operator shifts from the idle state to a gear, as illustrated in FIG. 6, the engagement between the protrusions 511' of the coupling block 51' and the recesses 521' of the gear 52' would not be smooth when they are not aligned with each other.

Referring to FIG. 7, when the operator accelerates to turn the operative disc 2' at a high speed, each pivotal block 22' pivots outward as a result of centrifugal force. Thus, the friction plates 23' engage with the engaging portion 31' of the transmission disc 3' to thereby move jointly. The transmission disc 3' turns to drive the follower shaft 4' at a high speed, thereby moving the vehicle. When gear shifting is proceeded at this high speed, the protrusions 511' of the coupling block 51' would impact the gear 52'. Damage is caused accordingly.

SUMMARY OF THE INVENTION

An object of the present invention is to provide a centrifugal clutch allowing smooth, convenient shifting of gear.

A centrifugal clutch in accordance with the present invention comprises a driving wheel, an operative disc connected to the driving wheel to move therewith, a transmission disc mounted to an outer periphery of the operative disc, a follower shaft, a friction mechanism, and a coupling device for releasable coupling with a gear train of a gearbox.

The driving wheel includes an engaging portion on a side thereof, the engaging portion including a friction portion. The operative disc includes plural pivotal blocks on the outer periphery thereof. Each pivotal block includes an end that is pivoted to the operative disc and has a friction plate on an outer side thereof. The transmission disc includes an engaging portion for frictional engagement with the pivotal blocks to move therewith. The follower shaft extends through the driving wheel, the operative disc, and the transmission disc. The follower shaft is securely engaged with a central portion of the transmission disc to turn therewith. The operative disc is turned together with the driving wheel. Each pivotal block is moved to a position for frictional engagement with the transmission disc when the operative disc turns at a high speed, thereby driving the transmission disc and the follower shaft to turn. The friction mechanism is fixed to the transmission disc and in frictional engagement with the friction portion of the driving wheel.

When the driving wheel turns at an idling speed, the friction portion drives the friction mechanism, the transmission disc, and the follower shaft to turn slowly with a constant torque, thereby allowing easy gear shifting through the coupling device.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
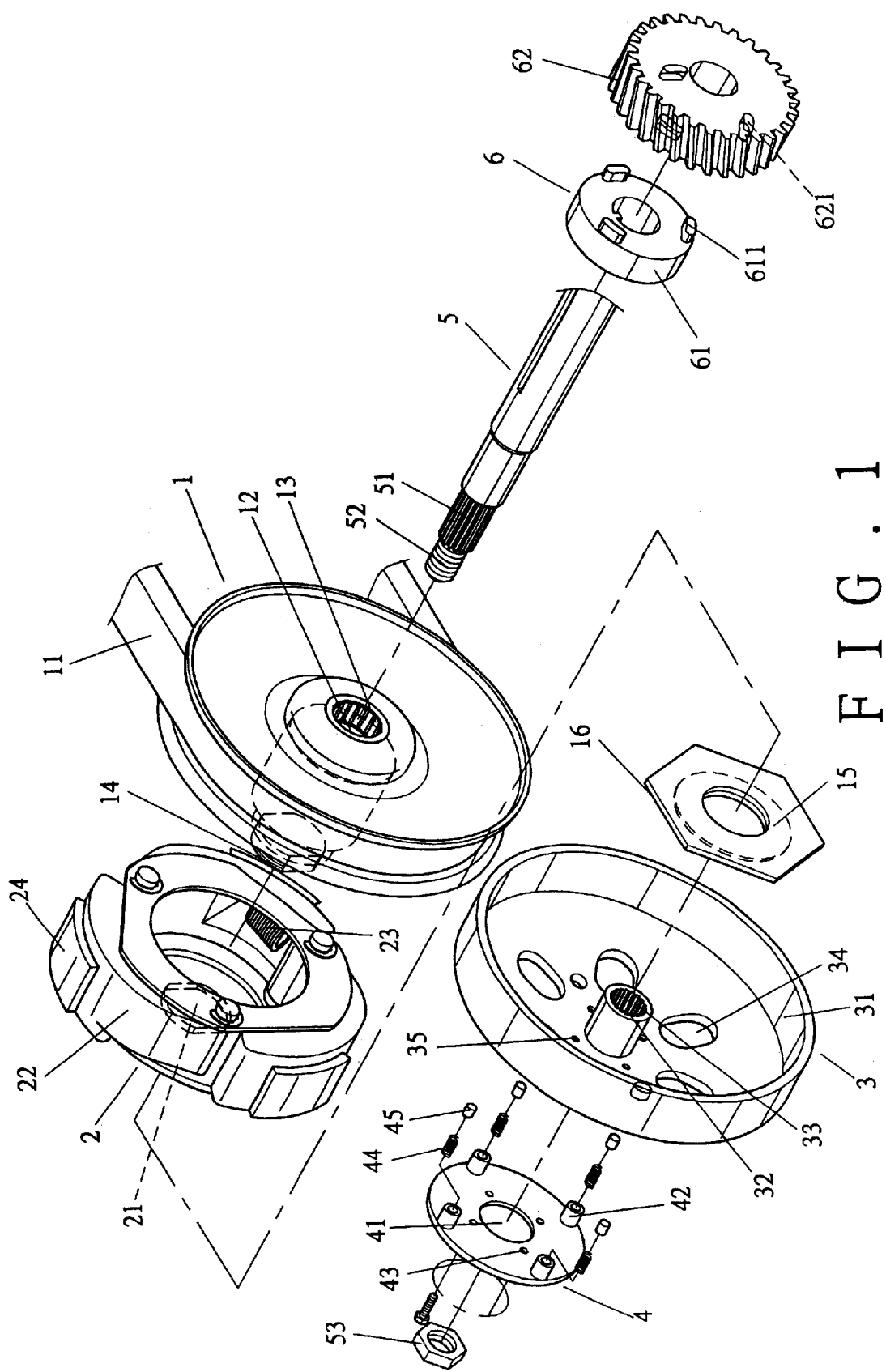
FIG. 1 is an exploded perspective view of a centrifugal clutch in accordance with the present invention.
Figure 2:
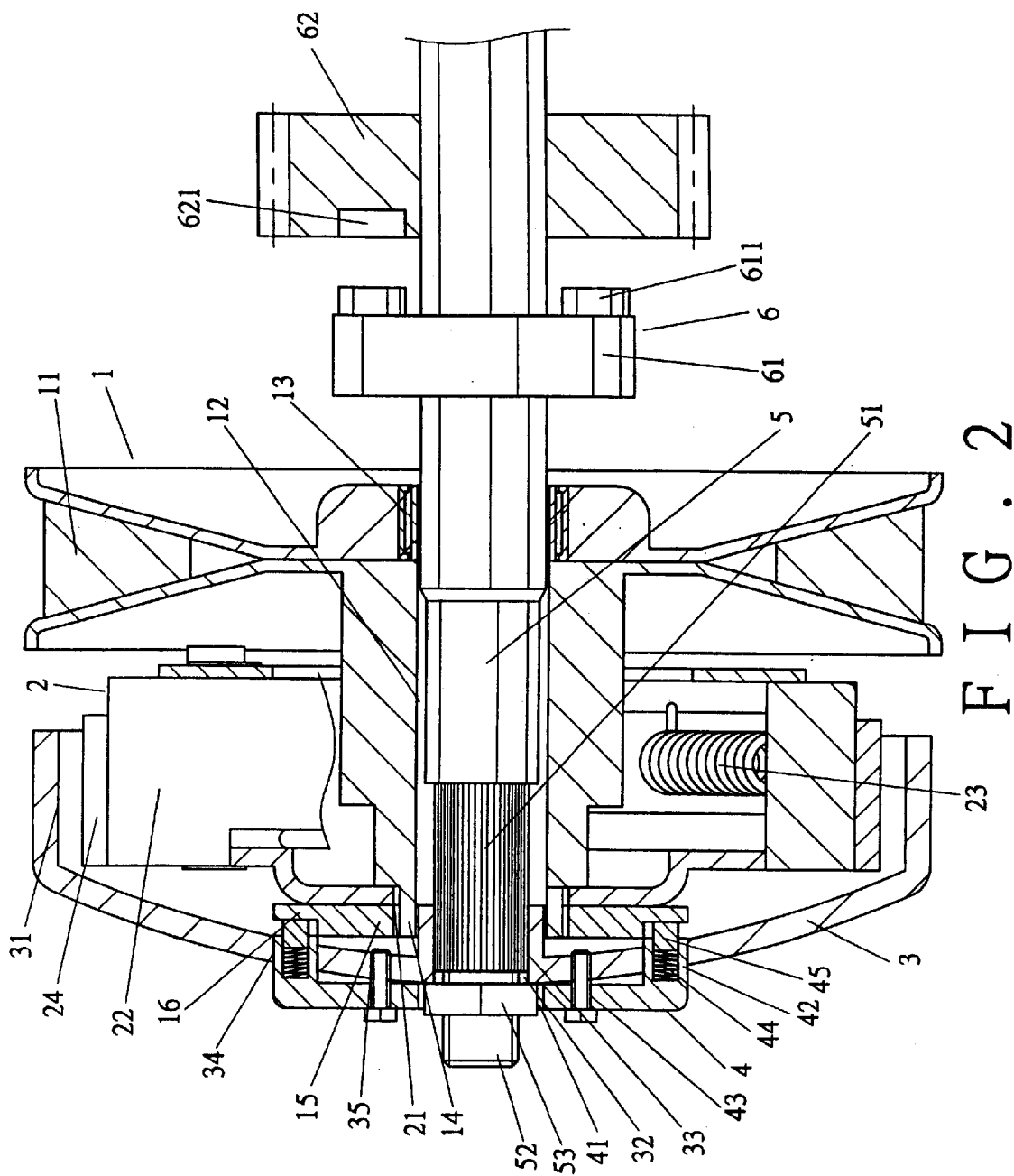
FIG. 2 is a sectional view of the centrifugal clutch in accordance with the present invention.

Referring to FIGS. 1 and 2, a centrifugal clutch in accordance with the present invention generally comprises a driving wheel 1, an operative disc 2, a transmission disc 3, a friction mechanism 4, and a follower shaft 5. The driving wheel 1 is driven by an engine (not shown) via a belt 11. The driving wheel 1 includes a central hole 12 for receiving a bearing 13 through which the follower shaft 5 extends. A side of the driving wheel 1 includes an engaging portion 14 to which a nut 15 is threadedly engaged. An outer periphery of the nut 15 serves as a friction portion 16 for engagement with the friction mechanism 4.

The operative disc 2 includes a central hole 21 through which the follower shaft 5 extends, thereby securely engaging with the driving wheel 1 to move therewith. The operative disc 2 further includes plural pivotal blocks 22 on an outer periphery thereof. Each pivotal block 22 has an end pivoted to the operative disc 2 and a friction plate 24 on an outer side thereof Each pivotal block 22 is attached to the operative disc 2 by a spring 23.

The transmission disc 3 is mounted to the outer periphery of the operative disc 2 and includes an engaging portion 31 for frictional engagement with the pivotal blocks 22 to move therewith. The transmission disc 3 further includes a central hole 32 for engaging with the follower shaft 5 to move therewith, the central hole 32 having teeth 33 defined in an inner periphery thereof. Further, the transmission disc 3 includes a plurality of through-holes 34 and engaging holes 35 for engaging with the friction mechanism 4.

The friction mechanism 4 is a plate having a through-hole 41 through which the follower shaft 5 extends. The plate further includes plural pegs 42 each having a hole (not labeled) therein for receiving a spring 44 and a friction block 45. Further, the plate includes plural fixing holes 43 corresponding to the engaging holes 35 of the transmission disc 3.

The follower shaft 5 extends through the driving wheel 1, the operative disc 2, the transmission disc 3, and the friction mechanism 4. An end of the follower shaft 5 includes teeth 51 and a threaded portion 52. The teeth 51 of the follower shaft 5 mesh with the teeth 33 of the transmission disc 3, and a nut 53 is engaged with the threaded portion 52 for positioning purpose. A coupling device 6 is mounted to the follower shaft 5 and includes a coupling block 61 and a gear 62 that is connected to a gear train (not shown) in a gearbox (not shown) of a vehicle. The coupling block 61 includes plural protrusions 611 on a side thereof. The gear 62 includes plural recesses 621 in a side thereof for releasable engagement with the protrusions 611, thereby allowing joint movement of the gear 62 and the coupling block 61.

In assembly, the friction mechanism 4 is fixed to the transmission disc 3 by means of extending fasteners (not labeled) through the fixing holes 43 of the friction mechanism 4 and the engaging holes 35 of the transmission disc 3. The pegs 42 of the friction mechanism 4 extend through the through-holes 34 of the transmission disc 3 and are thus located in an inner side of the transmission disc 3. The friction blocks 45 are biased by the springs 44 to be in contact with the friction portion 16 of the nut 15. In an alternative embodiment, the friction mechanism 4 and the transmission disc 3 are integrally formed.

Figure 3:
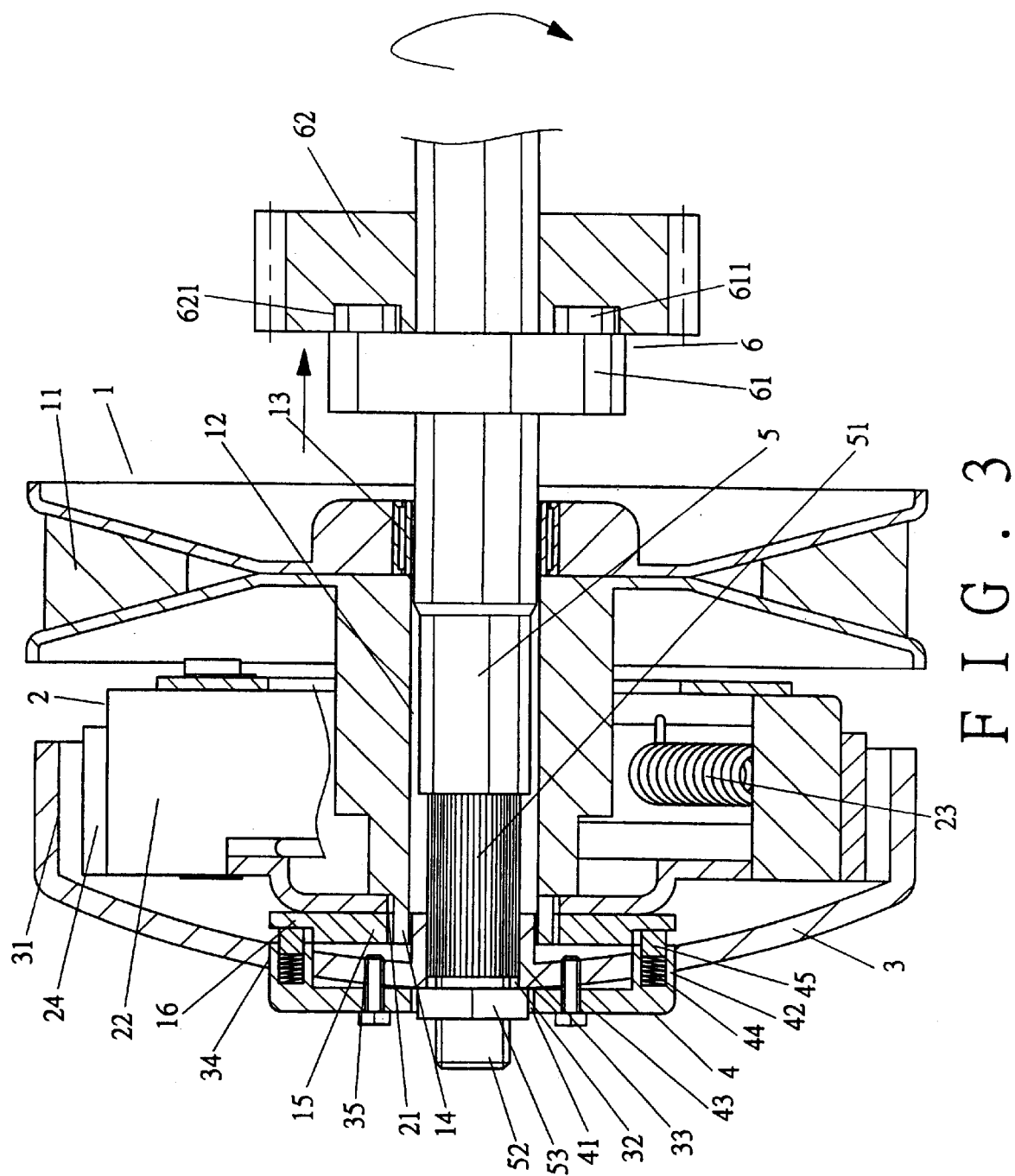
FIG. 3 is a sectional view similar to FIG. 2, illustrating gear shifting of the centrifugal clutch in accordance with the present invention at an idling speed.

When in an idle state, the engine drives the driving wheel 1 to run at the idling speed, which, in turn, causes rotation of the operative disc 2. In addition, the friction 16 of the nut 15 engage with the frictional blocks 45 of the friction mechanism 4, thereby turning the transmission disc 3 and the follower shaft 5 at a low speed with a constant torque. When shifting from the idle state to a gear, as illustrated in FIG. 3, the coupling block 61 is axially moved relative to the follower shaft 5 until the former is engaged with the gear 62. The engagement between the protrusions 611 of the coupling block 61 and the recesses 621 of the gear 62 proceeds smooth and easily as a result of the slow rotation of the transmission disc 3 and the follower shaft 5. Namely, even if the protrusions 611 of the coupling block 61 and the recesses 621 of the gear 62 are not aligned with each other, the protrusions 611 of the coupling block would slide into and thus engage in the recesses 621 of the gear 62, as the coupling block 61 turns together with the follower shaft 5 while the coupling block 61 moves axially toward the gear 62 along an axis of the follower shaft 5.

Figure 4:
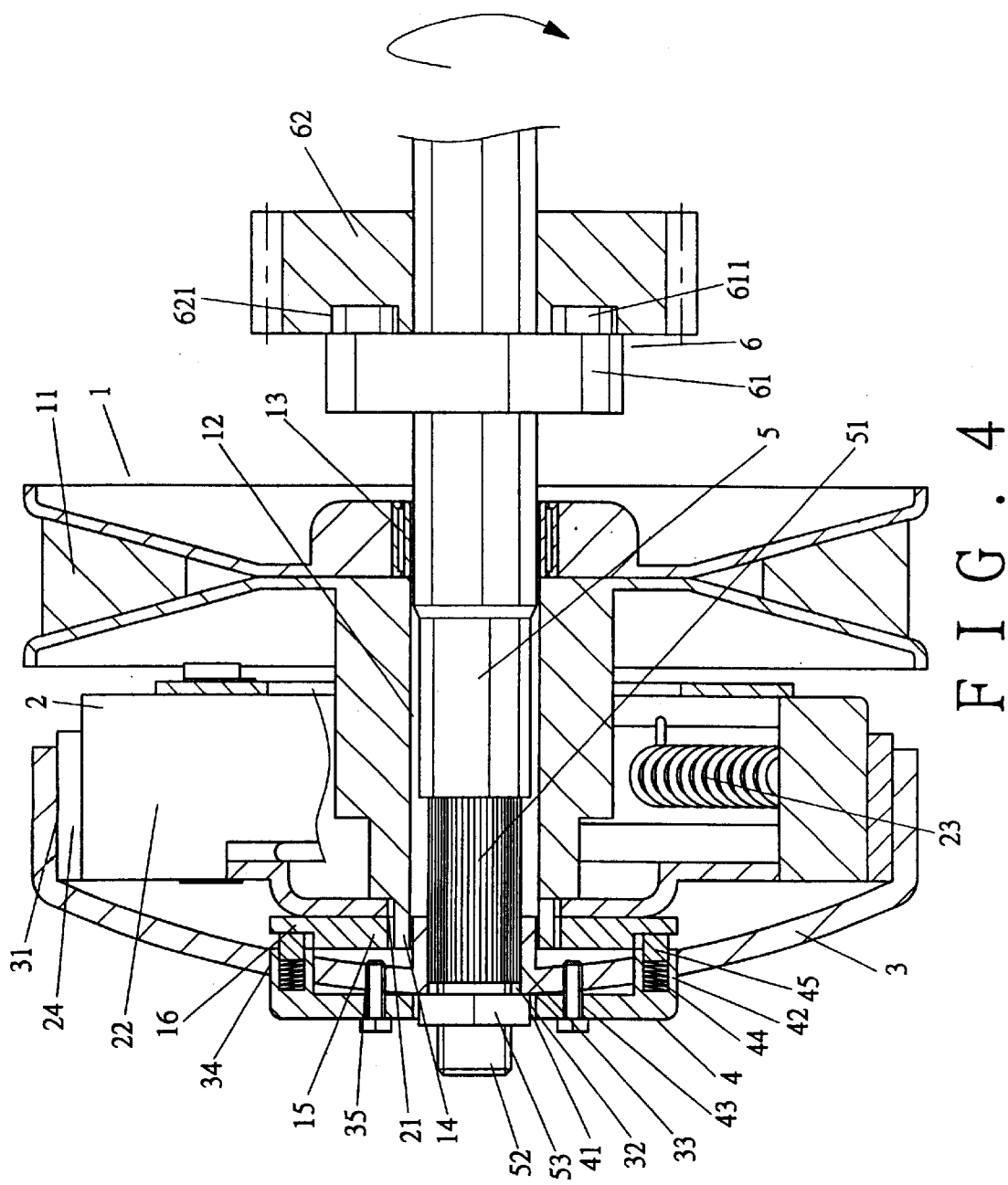
FIG. 4 is a sectional view similar to FIG. 2, illustrating gear shifting of the centrifugal clutch in accordance with the present invention at a high speed.
Figure 5:
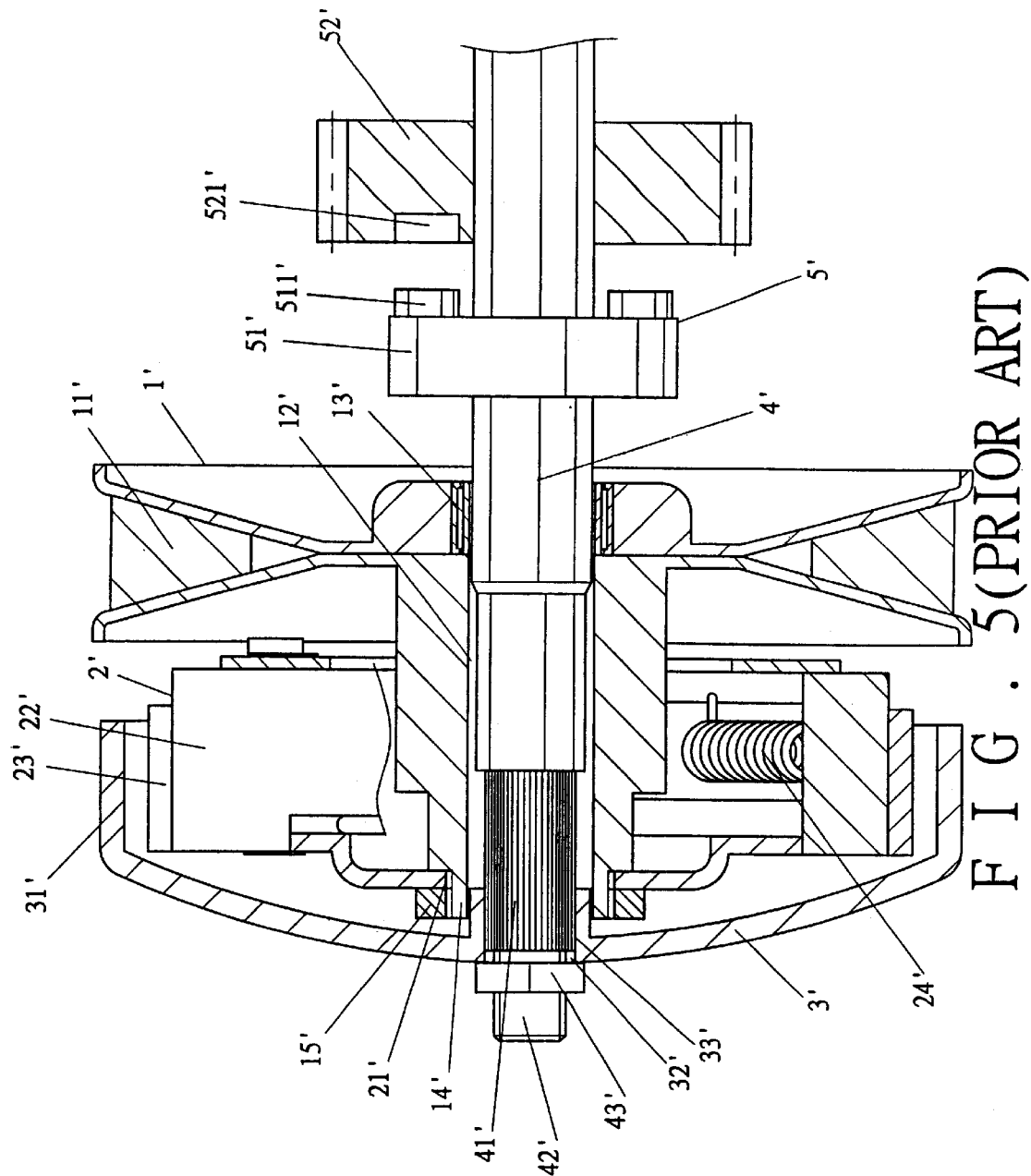
FIG. 5 is a sectional view of a conventional centrifugal clutch.
Figure 6:
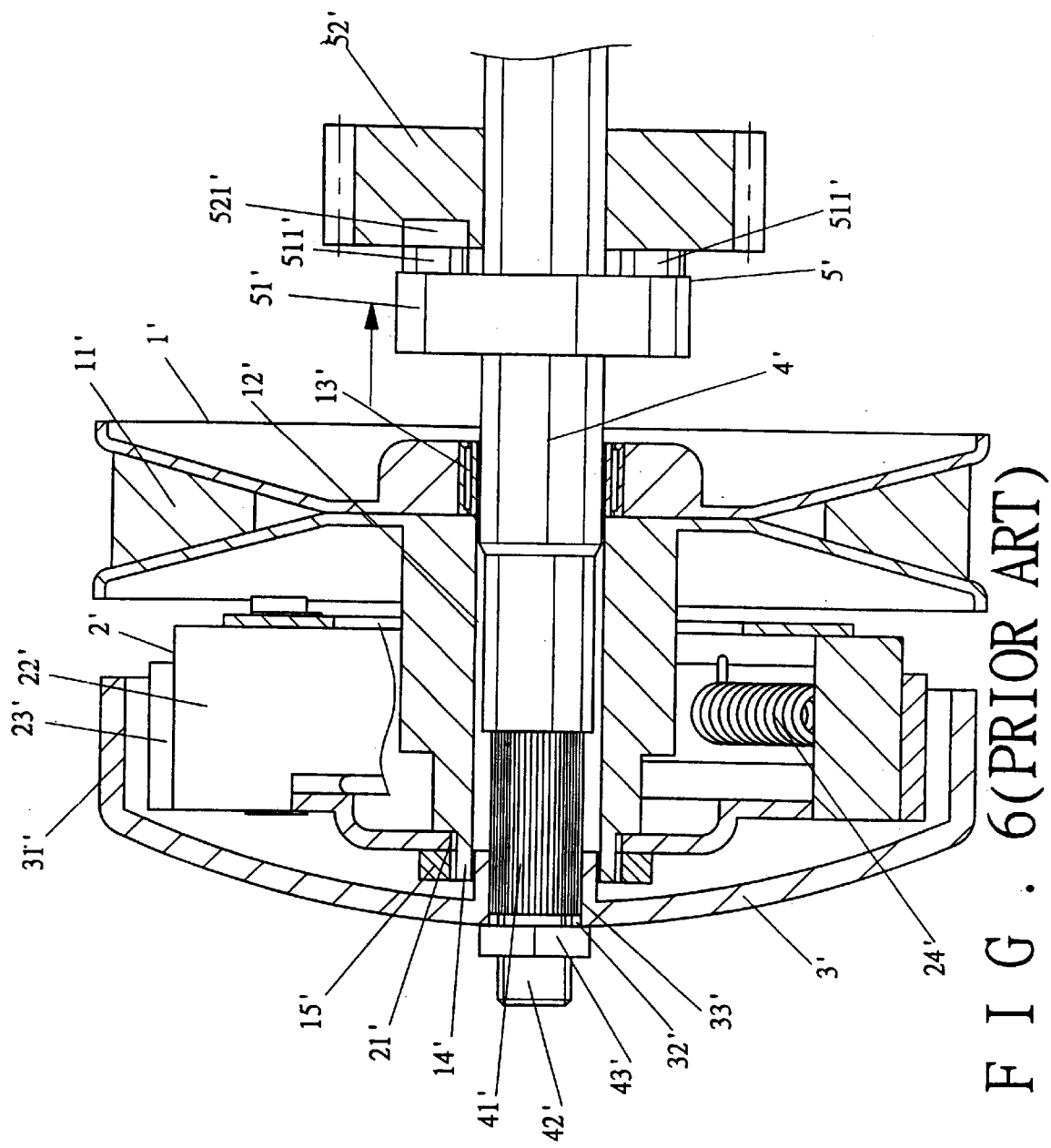
FIG. 6 is a sectional view similar to FIG. 5, illustrating gear shifting of the conventional centrifugal clutch at an idling speed.
Figure 7:
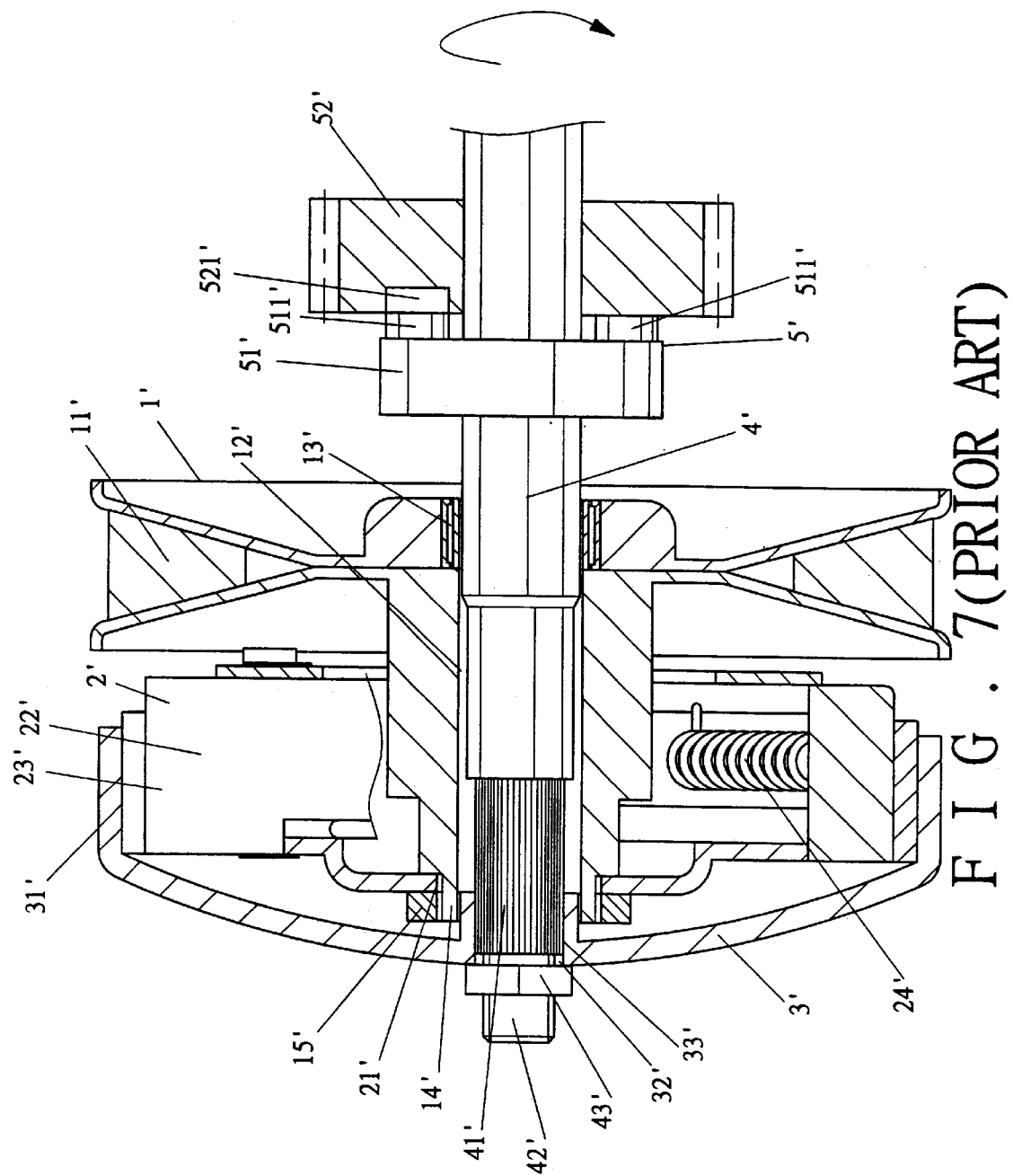
FIG. 7 is a sectional view similar to FIG. 5, illustrating gear shifting of the conventional centrifugal clutch at a high speed.

Referring to FIG. 4, when the operator accelerates to turn the driving wheel 1 and the operative disc 2 at a high speed, each pivotal block 22 pivots outward as a result of centrifugal force. Thus, the friction plates 24 engage with the engaging portion 31 of the transmission disc 3 to thereby move jointly. The transmission disc 3 turns to drive the follower shaft 5 at a high speed, thereby moving the vehicle.

According to the above description, it is appreciated that the gear shifting at the idling speed is accomplished easily and smoothly by means of providing the centrifugal clutch in accordance with the present invention.

Although the invention has been explained in relation to its preferred embodiment, it is to be understood that many other possible modifications and variations can be made without departing from the scope of the invention as hereinafter claimed.

What is claimed is:

1. A centrifugal clutch comprising:

a driving wheel including an engaging portion on a side thereof, the engaging portion including a friction portion;

an operative disc connected to the driving wheel to move therewith, the operative disc including plural pivotal blocks on an outer periphery thereof, each said pivotal block including an end that is pivoted to the operative disc and that has a friction plate on an outer side thereof;

a transmission disc mounted to the outer periphery of the operative disc, the transmission disc including an engaging portion for frictional engagement with the pivotal blocks to move therewith, the transmission disc including a central portion;

a follower shaft extending through the driving wheel, the operative disc, and the transmission disc, the follower shaft being securely engaged with the central portion of the transmission disc to turn therewith, the operative disc being turned together with the driving wheel, each said pivotal block being moved to a position for frictional engagement with the transmission disc when the operative disc turns at a high speed, thereby driving the transmission disc and the follower shaft to turn;

a friction mechanism fixed to the transmission disc and in frictional engagement with the friction portion of the driving wheel; and a coupling device for releasable coupling with a gear train of a gearbox;

wherein when the driving wheel turns at an idling speed, the friction portion drives the friction mechanism, the transmission disc, and the follower shaft to turn slowly with a constant torque, thereby allowing easy gear shifting through the coupling device.

2. The centrifugal clutch as claimed in claim 1, wherein the engaging portion of the driving wheel includes a nut mounted thereon, the nut including an outer periphery acting as the friction portion, the transmission disc including a plurality of through-holes and engaging holes for engaging with the friction mechanism, the friction mechanism being a plate and including a through-hole through which the follower shaft extends, the mechanism further including a plurality of fixing holes corresponding to the engaging holes of the transmission disc, the friction mechanism further including a plurality of pegs extending through the through-holes of the transmission disc, each said peg including a hole for receiving a spring and a friction block;

the coupling device including a coupling block mounted on the follower shaft and a gear mounted on the follower shaft, the gear being connected to the gear train of the gearbox, the coupling block including a plurality of protrusions on a side thereof, the gear including a plurality of recesses in a side thereof for releasable engagement with the protrusions of the coupling block;

each said friction block being biased by an associated one of said springs to be in frictional engagement with the friction portion of the nut.

3. The centrifugal clutch as claimed in claim 1, wherein the friction mechanism and the transmission disc are integrally formed.

4. The centrifugal clutch as claimed in claim 2, wherein the friction mechanism and the transmission disc are integrally formed.

\* \* \* \* \*